(12) United States Patent
Lavaque

(10) Patent No.: US 9,980,505 B2
(45) Date of Patent: May 29, 2018

(54) VARIABLE PRESSURE DEVICE FOR SOLUBILIZING CARBON DIOXIDE IN A BEVERAGE

(71) Applicant: Cylzer S.A., Planta Baja, Montevideo OT (UY)

(72) Inventor: Oscar Lavaque, Boulogne (AR)

(73) Assignee: CYLZER S.A., Montevideo (UY)

(*) Notice: Subject to any disclaimer, the term of this patent is extended or adjusted under 35 U.S.C. 154(b) by 261 days.

(21) Appl. No.: 14/931,430

(22) Filed: Nov. 3, 2015

(65) Prior Publication Data

US 2016/0120209 A1    May 5, 2016

Related U.S. Application Data

(63) Continuation of application No. 13/567,391, filed on Aug. 6, 2012, now Pat. No. 9,622,504.

(30) Foreign Application Priority Data

Aug. 9, 2011    (AR) ............................ P110102885

(51) Int. Cl.
  *A23L 2/54*    (2006.01)
  *B01F 5/04*    (2006.01)
  (Continued)

(52) U.S. Cl.
  CPC ............ *A23L 2/54* (2013.01); *B01F 3/04751* (2013.01); *B01F 3/04808* (2013.01);
  (Continued)

(58) Field of Classification Search
  CPC .... A23L 2/54; B01F 5/0057; B01F 15/00162; B01F 15/00344; B01F 15/0261;
  (Continued)

(56) References Cited

U.S. PATENT DOCUMENTS

| 571,692 A | 11/1896 | Schneible |
| 1,611,321 A | 12/1926 | Schmidt |
| (Continued) | | |

FOREIGN PATENT DOCUMENTS

| AR | 047011 A1 | 8/2004 |
| AR | 239746 | 11/2004 |
| (Continued) | | |

OTHER PUBLICATIONS

Google translation of Brosseau et al. FR 2.191.547 published Jun. 1972.*

(Continued)

*Primary Examiner* — Amber R Orlando
*Assistant Examiner* — Stephen Hobson
(74) *Attorney, Agent, or Firm* — Volpe and Koenig, P.C.

(57) ABSTRACT

A variable pressure device to solubilize carbon dioxide (CO2) in a beverage includes: a carbonation tank, a CO2 inlet valve and a venting valve attached to the tank's top part; a discharge valve attached to the tank's bottom part; a booster pump arranged immediately after the discharge valve; a recycling valve arranged immediately after the booster pump, which is connected to a recycling inlet at the top part of the tank; an outlet between the pump and the recycling valve; a level sensor arranged on the lid of the tank; a CO2 inlet valve attached to a tank side near its top part; a modulating valve arranged after the CO2 inlet valve; a Venturi attached immediately after the modulating valve; a control point arranged between the modulating valve and the Venturi; and a beverage inlet valve into the tank attached immediately after the Venturi, which is formed by a pipeline.

10 Claims, 5 Drawing Sheets

(51) Int. Cl.
  *B01F 5/10* (2006.01)
  *B01F 3/04* (2006.01)
  *B01F 5/00* (2006.01)
  *B01F 15/00* (2006.01)
  *B01F 15/02* (2006.01)

(52) U.S. Cl.
  CPC ........ *B01F 3/04815* (2013.01); *B01F 5/0057* (2013.01); *B01F 5/0428* (2013.01); *B01F 5/10* (2013.01); *B01F 15/00162* (2013.01); *B01F 15/00344* (2013.01); *B01F 15/0261* (2013.01); *A23V 2002/00* (2013.01)

(58) Field of Classification Search
  CPC ...... B01F 5/10; B01F 5/0428; B01F 3/04751; B01F 3/04808; B01F 3/04815; A23V 2002/00
  See application file for complete search history.

(56) References Cited

U.S. PATENT DOCUMENTS

| | | |
|---|---|---|
| 1,808,956 A | 6/1931 | Ketterer |
| 1,835,812 A | 12/1931 | Ridler |
| 2,585,570 A | 2/1952 | Messinger et al. |
| 2,719,704 A | 10/1955 | Anderson et al. |
| 2,965,362 A | 12/1960 | Flottmann et al. |
| 2,979,916 A | 4/1961 | Mason |
| 3,097,504 A | 7/1963 | Quick et al. |
| 3,256,802 A | 6/1966 | Karr |
| 3,370,755 A | 2/1968 | Querner |
| 3,394,847 A | 7/1968 | Garrard |
| 3,489,396 A | 1/1970 | Aragon |
| 3,510,252 A | 5/1970 | Reich |
| 3,556,489 A | 1/1971 | Ueda |
| 3,761,066 A | 9/1973 | Wheeler |
| 3,770,254 A | 11/1973 | Morrow |
| 3,832,474 A | 8/1974 | Karr |
| 3,877,358 A | 4/1975 | Karr |
| 3,881,636 A | 5/1975 | D Aubreby |
| 3,960,066 A * | 6/1976 | LaRocco .................. A23L 2/54 426/590 |
| 3,960,175 A | 6/1976 | Liepe et al. |
| 3,990,427 A | 11/1976 | Clinebell |
| 4,019,983 A | 4/1977 | Mandt |
| 4,028,441 A | 6/1977 | Richards |
| 4,051,204 A | 9/1977 | Muller et al. |
| 4,133,853 A | 1/1979 | Ore et al. |
| 4,140,245 A | 2/1979 | Castillo |
| 4,211,735 A | 7/1980 | Berlin |
| 4,235,719 A | 11/1980 | Pearson |
| 4,239,956 A | 12/1980 | Morton |
| 4,308,138 A | 12/1981 | Woltman |
| 4,512,888 A | 4/1985 | Flynn |
| 4,562,014 A | 12/1985 | Johnson |
| 4,564,375 A | 1/1986 | Munk et al. |
| 4,636,337 A | 1/1987 | Gupta et al. |
| 4,829,775 A | 5/1989 | Defrancesco |
| 4,956,080 A | 9/1990 | Josefik |
| 5,054,688 A | 10/1991 | Grindley |
| 5,062,548 A | 11/1991 | Hedderick et al. |
| 5,391,328 A | 2/1995 | Ott et al. |
| 5,402,967 A | 4/1995 | Hughes |
| 5,524,848 A | 6/1996 | Ellsworth |
| 5,598,837 A | 2/1997 | Sirianne et al. |
| 5,622,655 A | 4/1997 | Cincotta et al. |
| 5,681,507 A | 10/1997 | Kazuma |
| 5,842,497 A | 12/1998 | Drifka et al. |
| 5,842,600 A | 12/1998 | Singleterry et al. |
| 5,851,445 A | 12/1998 | Kazuma |
| 5,873,256 A | 2/1999 | Denniston |
| 5,955,009 A | 9/1999 | Kazuma |
| 6,059,270 A | 5/2000 | Kurzer et al. |
| 6,092,794 A | 7/2000 | Reens |
| 6,099,404 A | 8/2000 | Hartenstein et al. |
| 6,105,942 A | 8/2000 | Kurzer et al. |
| 6,113,080 A | 9/2000 | Kazuma |
| 6,237,897 B1 | 5/2001 | Marina et al. |
| 6,270,059 B1 | 8/2001 | Kurzer et al. |
| 6,364,625 B1 | 4/2002 | Sertier |
| 6,406,006 B1 | 6/2002 | Dettling et al. |
| 6,734,405 B2 | 5/2004 | Centanni et al. |
| 6,764,213 B2 | 7/2004 | Shechter |
| 6,923,006 B2 | 8/2005 | Walton et al. |
| 6,990,964 B2 | 1/2006 | Strohle |
| 7,066,452 B2 | 6/2006 | Rotering et al. |
| 7,188,488 B2 | 3/2007 | Army et al. |
| 7,354,029 B1 | 4/2008 | Rutstein |
| 8,177,197 B1 | 5/2012 | Ergican |
| 8,720,439 B1 | 5/2014 | Kolkowski et al. |
| 8,939,129 B2 | 1/2015 | Prinz et al. |
| 8,985,966 B2 | 3/2015 | Sampson et al. |
| 2002/0134321 A1 | 9/2002 | Alix et al. |
| 2003/0121937 A1* | 7/2003 | Black .................. B67D 1/06 222/129.1 |
| 2003/0177784 A1 | 9/2003 | Walton et al. |
| 2005/0051577 A1 | 3/2005 | Loeb et al. |
| 2005/0089408 A1 | 4/2005 | Solomon |
| 2005/0127540 A1 | 6/2005 | Han |
| 2008/0135646 A1 | 6/2008 | Wilkinson |
| 2008/0187794 A1 | 8/2008 | Weingaertner et al. |
| 2009/0130278 A1 | 5/2009 | Murota |
| 2009/0189018 A1 | 7/2009 | Dittmar et al. |
| 2009/0321544 A1 | 12/2009 | Akisada et al. |
| 2010/0043794 A1 | 2/2010 | Saito et al. |
| 2013/0240355 A1 | 9/2013 | Ho et al. |
| 2014/0102422 A1 | 4/2014 | Prinz et al. |
| 2014/0145012 A1 | 5/2014 | Ritchie et al. |
| 2014/0286122 A1 | 9/2014 | Livshits et al. |
| 2015/0343399 A1 | 12/2015 | Kim et al. |
| 2016/0325245 A1 | 11/2016 | Delerue et al. |

FOREIGN PATENT DOCUMENTS

| | | |
|---|---|---|
| DE | 4137573 A1 | 5/1993 |
| DE | 29705398 U1 | 5/1997 |
| EP | 0 602 387 * | 6/1994 |
| EP | 0602387 A1 | 6/1994 |
| EP | 0745425 A1 | 12/1996 |
| EP | 1090677 A1 | 4/2001 |
| FR | 2123429 A3 | 9/1972 |
| FR | 2191547 A5 | 2/1974 |
| FR | 2.191.547 * | 6/1978 |
| FR | 2857274 A1 | 1/2005 |
| GB | 1314832 A | 4/1973 |
| GB | 1600802 A | 10/1981 |
| GB | 2370561 A | 7/2002 |
| GB | 2377427 A | 1/2003 |
| GB | 2514202 A | 11/2014 |
| WO | 9307960 A1 | 4/1993 |
| WO | 2001003817 A1 | 1/2001 |
| WO | 02051739 A2 | 7/2002 |
| WO | 02051739 A3 | 10/2002 |
| WO | 2014184585 A2 | 11/2014 |

OTHER PUBLICATIONS

EPO translation of Manfred EP 0 602 387 A1 published Jun. 22, 1994.*
Google translation of Manfred EP 0 602 387 A1 published Nov. 1993.
Transcat Rosemount 2110 Product Data Sheet published Feb. 2008.
"Capacitance Level Measurement" published May 12, 2003 online at <https://web.archive.org/web/20030512055019/http://www.omega.com/Green/pdf/CAP_LEV_MEAS.pdf>.
"3M Retention Valve" published 2007.

* cited by examiner

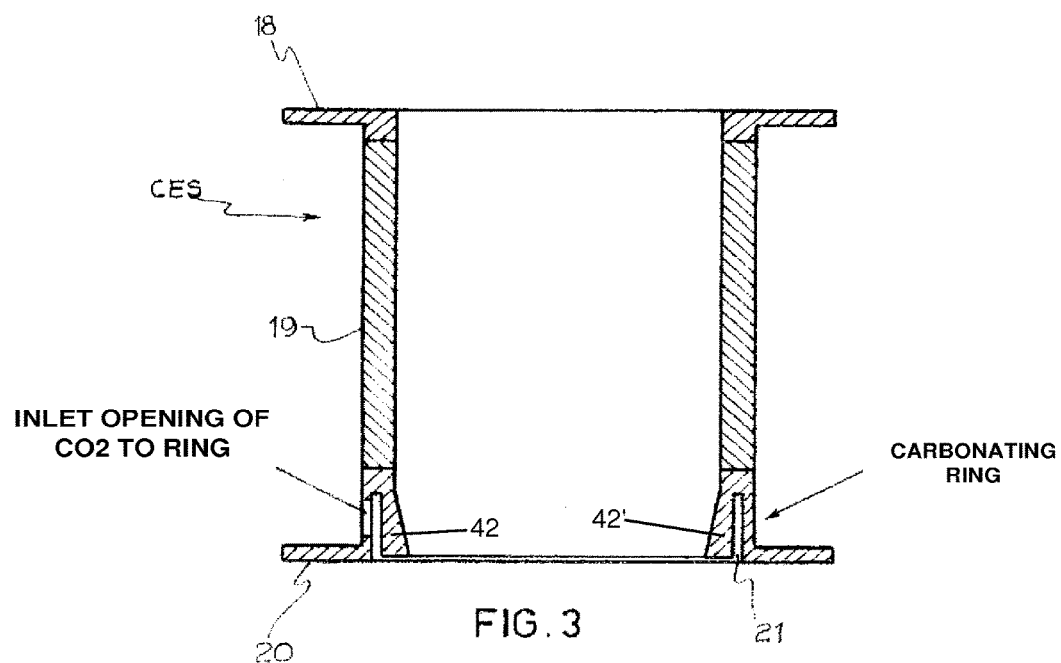
FIG. 3
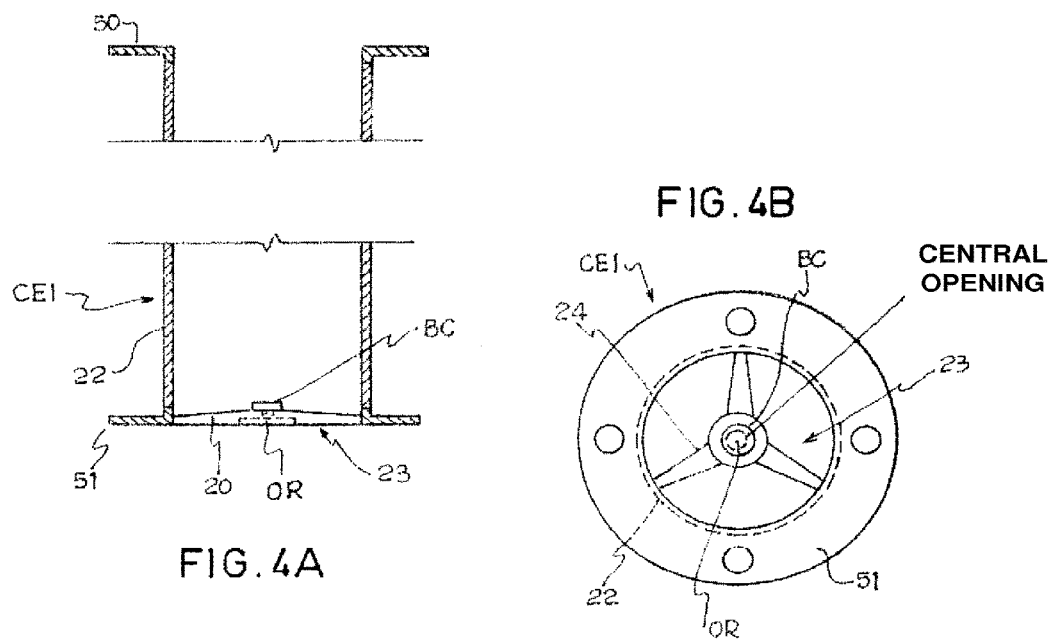
FIG. 4B
FIG. 4A

VARIABLE PRESSURE DEVICE FOR SOLUBILIZING CARBON DIOXIDE IN A BEVERAGE

CROSS REFERENCE TO RELATED APPLICATIONS

The present application is a continuation of U.S. application Ser. No. 13/567,391, filed Aug. 6, 2012, which claims benefit under 35 U.S.C. 119 to Argentine patent application No. P110102885, dated Aug. 09, 2011, the entire contents of which are incorporated by reference as if fully set forth.

FIELD OF THE INVENTION

The present invention relates to a variable pressure equipment to solubilze carbon dioxide ($CO_2$) in a beverage. More specifically, the present invention relates to a device that provides gas solubility in a beverage without controlling the pressure of the carbonation tank, and maintaining a constant carbon dioxide volume during the whole process of beverage production.

BACKGROUND

WO01/03817 A1 discloses a carbonating device that provides carbon dioxide under pressure into a beverage, wherein the feeding tip comprises a variable Venturi hole where said carbon dioxide under pressure contacts the beverage, the Venturi variation being adjustable.

U.S. Pat. No. 256,802 discloses a continuous carbonation system, where stopping carbonated beverage or beverage to be carbonated immediately stops carbon dioxide intake so as to avoid over-carbonation. The carbonated beverage is previously stabilized before reaching the bottling station, as undesired gas traces within the carbon dioxide are ineffective to produce foam in the filling heads. Carbon dioxide enters the beverage under pressure by means of a Venturi.

U.S. Pat. No. 5,842,600 discloses a carbonation apparatus and process, wherein carbonated water is prepared by a process combining respective water and carbon dioxide flow streams in a mixing Venturi. Downstream from Venturi, the water and carbon dioxide mixture goes through a static mixer prior to the dispenser discharge.

GB1314832 discloses a system for controlling a beverage flow, which automatically regulates flow rate of a carbonated beverage from a supply source towards a receptacle or tank, according to a low or high beverage level inside the tank.

AR239746 describes an apparatus to carbonate or enrich with carbonic acid a predetermined amount of beverage, comprising a venting means attached to the headspace, said venting means having a duct provided between the headspace and the environment, and a gas-permeable plate provided in the duct aimed at limiting the rate of flow through the duct, so as to be able to continuously purge gas from the headspace while maintaining a predetermined pressure.

In general, the above documents are "in situ" carbonated beverage dispensers, or regulators of the carbon dioxide amount in a beverage to be carbonated, such as water or a syrup in particular. Furthermore, some of them "vent out" carbonic gas to the environment during the process of carbonated beverage production.

None of the above-mentioned devices has the two principles included in the device of the present invention. On one hand, the present invention uses the Venturi principle to achieve gas solubility in the beverage (Venturis used in prior art documents are not used for this purpose), and on the other, carbonation tank pressure control for maintaining a constant carbon dioxide volume during beverage production is unnecessary. Besides in order to reach high carbon dioxide volumes, conventional shower systems and high pressure pumps should generate an elevated pressure in the mixture, and in several contact stages, whereby the beverage becomes so agitated that renders packaging very difficult.

SUMMARY

Thus, it is an object of the present application to provide a variable pressure device to solubilize carbon dioxide in a beverage, including:
a carbonation tank;
a carbon dioxide inlet valve and a venting valve, both of them being attached to the top part of said tank;
a discharge valve attached to the bottom part of said tank;
a booster pump arranged immediately after said discharge valve;
a recycling valve arranged immediately after said booster pump, which in turn is connected to a recycling inlet at the top part of said tank;
an outlet to a filling equipment arranged between said pump and said recycling valve;
a level sensor arranged on the lid of said tank;
a carbon dioxide inlet valve attached to a side of the tank, adjacent to the top part thereof;
a modulating valve arranged after said carbon dioxide inlet valve;
a Venturi arranged after said modulating valve;
a control point arranged between said modulating valve and said Venturi; and
an inlet valve to feed the beverage into the tank immediately after said Venturi, the device comprising a pipeline consisting of:
an upper outer body;
a lower outer body linked to said upper outer body, both forming a pipeline;
a bullet arranged in the interior of said pipeline; and
a vortex throttle assembly arranged at the lower end of said bullet, and formed by at least two vortex elements facing each other and on both sides of said lower outer body walls.

BRIEF DESCRIPTION OF THE DRAWINGS

To better understand the concepts of this invention and for the sake of clarity, the invention core has been illustrated according to its preferred embodiments, all of which being merely exemplary in nature:

FIG. 3 illustrates the Venturi upper outer body laterally;

FIG. 4A is a side view of the Venturi lower outer body, and FIG. 4B is a bottom view thereof with its fixing star;

DETAILED DESCRIPTION OF THE PREFERRED EMBODIMENTS

Introduction to the Embodiments

The device of the invention is intended to overcome the above-mentioned disadvantages and features the following advantages:

The Venturi of the present invention device losses only 10-20% of pressure difference between the inlet and the throat thereof, whereby the beverage undergoes no agitation, which is significantly advantageous for carbonated beverage packaging purposes and to enhance gas dissolution.

No further homogenizing process is required after carbonation, which means effectiveness and efficacy of the process.

Carbonation through the Venturi of the present invention device allows optimal carbon dioxide dissolution in the beverage, thus minimizing said gas consumption.

Impact generated on the kinetic energy of the beverage-soluble gas is very low, thus minimizing foaming upon packaging.

Low level of carbon dioxide release from the beverage.

No flowmeters are required to control the gas flow rate during the carbonation process, thus maintaining carbonation effectiveness.

The tank has no internal rings, or plates, or other types of equipment used in conventional carbonation systems.

Only one tank is needed to reach gas solubility.

There is no gas venting as the system retrieves the gas not retained in the beverage, using it again for the carbonation process. This means a lower environmental impact.

The Venturi of the present invention device takes advantage of the speed at which the beverage enters into the tank in order to generate the necessary vacuum to carbonate the beverage, and so gas pressures at the inlet can be relatively low.

Upon carbonation bypassing, it is possible to recycle beverage to increase or reduce the gas volume.

Volume of carbon dioxide is kept stable by increasing the temperature.

Detailed Description

Figure 1:
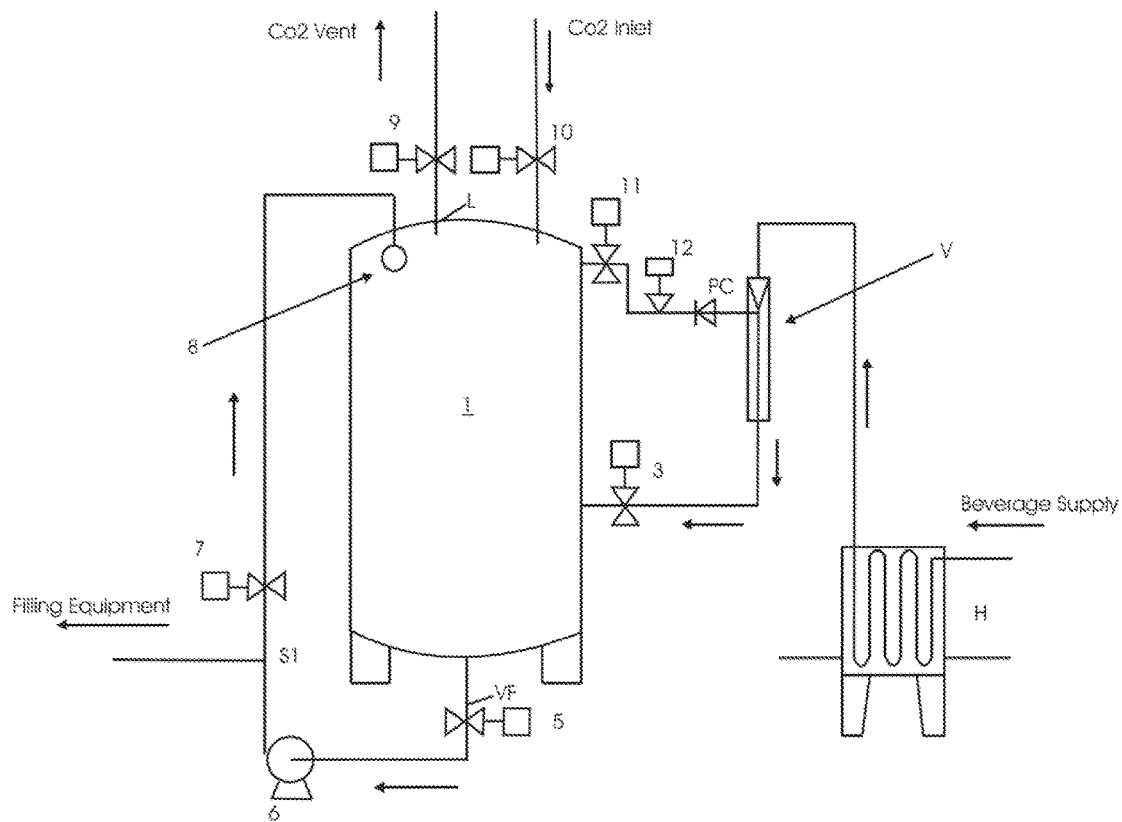
FIG. 1 illustrates a layout of the invention carbonating device.

In FIG. 1 a layout of the invention device is illustrated, comprising a beverage carbonation tank 1, said beverage being water or a particular syrup. Said tank 1 is made from an AISI 304 stainless steel sheet, preferably 5 mm thick. This sheet should be rolled to a cylinder 900 mm in diameter, and joined using an inert welding on its outer and inner face. Once the cylinder has been formed, the caps are welded, one top and another bottom, in its top and bottom part, respectively. The top cap will have an inspection opening provided with a 350 mm diameter flange, on which a 1" pipe is welded for venting purposes, said pipe being associated with a venting valve 9, a 1" pipe for carbon dioxide inlet, which is associated to a carbon dioxide inlet valve 10, a flange for a safety valve, a 1" pipe communicating a recycling valve 7 having a recycling inlet 8 to the tank 1, and a collar for a pressure transducer (not shown). In the above-mentioned inspection opening a collar including a level sensor, preferably of the capacitive type, is placed. The bottom cap has only a discharge pipe associated with a discharge valve 5, for beverage discharging from the tank 1. Immediately after said discharging valve 5, a booster pump 6 is connected, which drives beverage up towards the tank top part 1, or by means of an outlet S1, to filling equipment (not shown), depending on whether said recycling valve 7 is opened or closed. Said outlet S1 is located between said pump 6 and said recycling valve 7. The tank 1 is designed and built to withstand maximum pressures up to 8 Kg/cm$^2$. The tank is externally polished, and 3 4" pipe legs are attached thereto with a flat plate in its bottom part. A 1" collar is attached to the discharge pipe in order to install a vibrating fork (not shown). At the side of the tank 1, some 200 mm away from its top part, a flange for a pipe carrying carbon dioxide to a Venturi V is placed. Said pipe is associated with a carbon dioxide inlet valve 11 to the Venturi V, and subsequently to a modulating valve 12, and it includes a control point (PC) between said modulating valve 12 and the inlet into said Venturi V. Said modulating valve 12 is a retention valve. Further, the beverage entry into the tank 1 is effected by means of a beverage inlet valve 3 arranged immediately after said Venturi V. Prior to its passing through the Venturi, the beverage passes through the heat exchanger H, where it mixes up with glycol. Said tank 1 is subjected to a carbon dioxide pressure, which will vary as the volume in tank 1 varies due to the beverage supply therein. In order to carbonate the beverage, said Venturi V will take gas (i.e., carbon dioxide) from the top part of tank 1, its flow rate being controlled by said modulating valve 12. The carbonation inside the Venturi V is produced by the action of two principles, already mentioned, the Venturi effect and the vortex effect. Unlike conventional systems where the pipeline section forming a Venturi is reduced like a bottleneck, in the present invention the pipeline section forming the Venturi is reduced even further due to the insertion of a stainless steel bullet B therein, thus maximizing the contact surface between gas and beverage.

Figure 2:
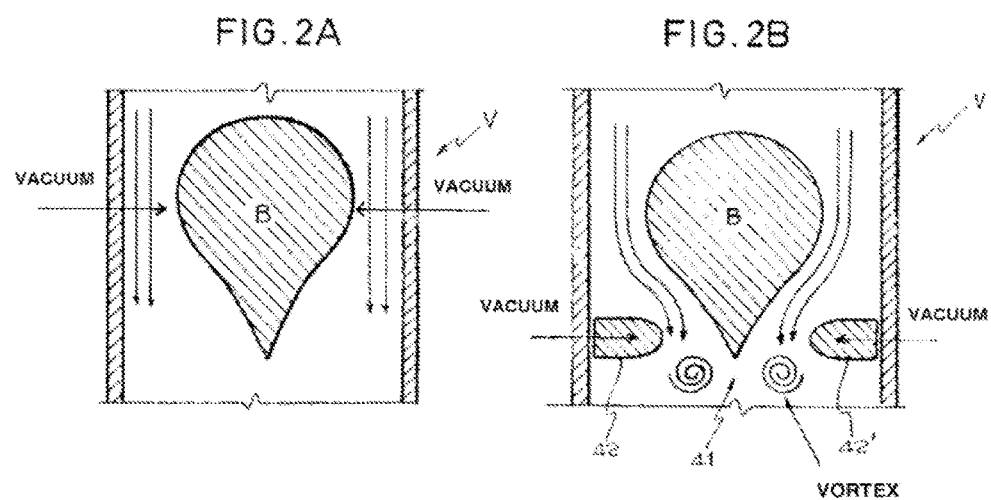
FIGS. 2A and 2B illustrate a side view of a pipeline forming the invention Venturi, wherein the reduction in section generated by the Venturi effect due to the presence of the bullet, and the vortex effect due to the presence of vortex throttle assembly, are respectively observed.

FIG. 2A illustrates a pipeline forming the Venturi of the present invention. Said pipeline is entirely manufactured of AISI 304 stainless steel, and consists of an upper outer body [CES] and a lower outer body [CEI] assembled together (see FIGS. 3, 4 and 6), and a bullet B arranged inside said upper and lower outer bodies (CES, CEI), its purpose being that of creating a section reduction in the pipeline so as to reduce fluid pressure, thus creating the Venturi V principle. While low pressure in the section reduction area of the above mentioned pipeline promotes incorporation of carbon dioxide and solubility thereof in the beverage, in order to further increase and ensure gas homogenization, a vortex throttle assembly 41 is incorporated, generated by at least two vortex elements (42, 42') arranged facing each other, and on both sides of, the walls of said Venturi V, to generate a vortex effect, as illustrated in FIG. 2B. This vortex effect leads to beverage turbulence upon exiting from the section reduction.

The upper outer body (CES) is comprised of three pieces, as illustrated in FIG. 3. On one side, a first upper flange 18 of OD 127 mm, under DIN 65 standard; a central body 19 formed by a nominal 2 ½" pipe, welded on one end to said first upper flange 18 and on the other, to a carbonating ring 20. Said carbonating ring 20 is manufactured with AISI 304 stainless steel, wherein a groove 21 is laterally machined, and through which carbon dioxide is to enter. In turn it will have an 18 mm inlet, and by fixing means, such as screws, said CES is secured to the carbon dioxide inlet pipeline, and to said lower outer body (CEI).

The lower outer body (CEI) comprises the following pieces, all of them manufactured with AISI 304 stainless steel, as illustrated in FIG. 4A. At both ends of said lower outer body (CEI) a second upper flange 50 which links said upper outer body (CES) to a lower flange 51 of OD 127 mm DIN 65, both welded to a 2" ½ nominal pipe forming the primary body, are respectively arranged. As illustrated in FIG. 4B, at the lower part of said lower outer body (CEI), a fixing star 23, which can be appreciated in its top view, is arranged. This fixing star 23 is built from a AISI 304 stainless steel sheet, to which the star itself is milled. There is a threaded opening [OR] in its center and a centering pillow [BC]. Care should be taken that the star center 23 is concentric to the pipe wall because the star arms 24 are welded to the pipe internal part. Said upper outer body (CES) and said lower outer body (CEI) are substantially identical to achieve beverage flow continuity.

Figure 5:
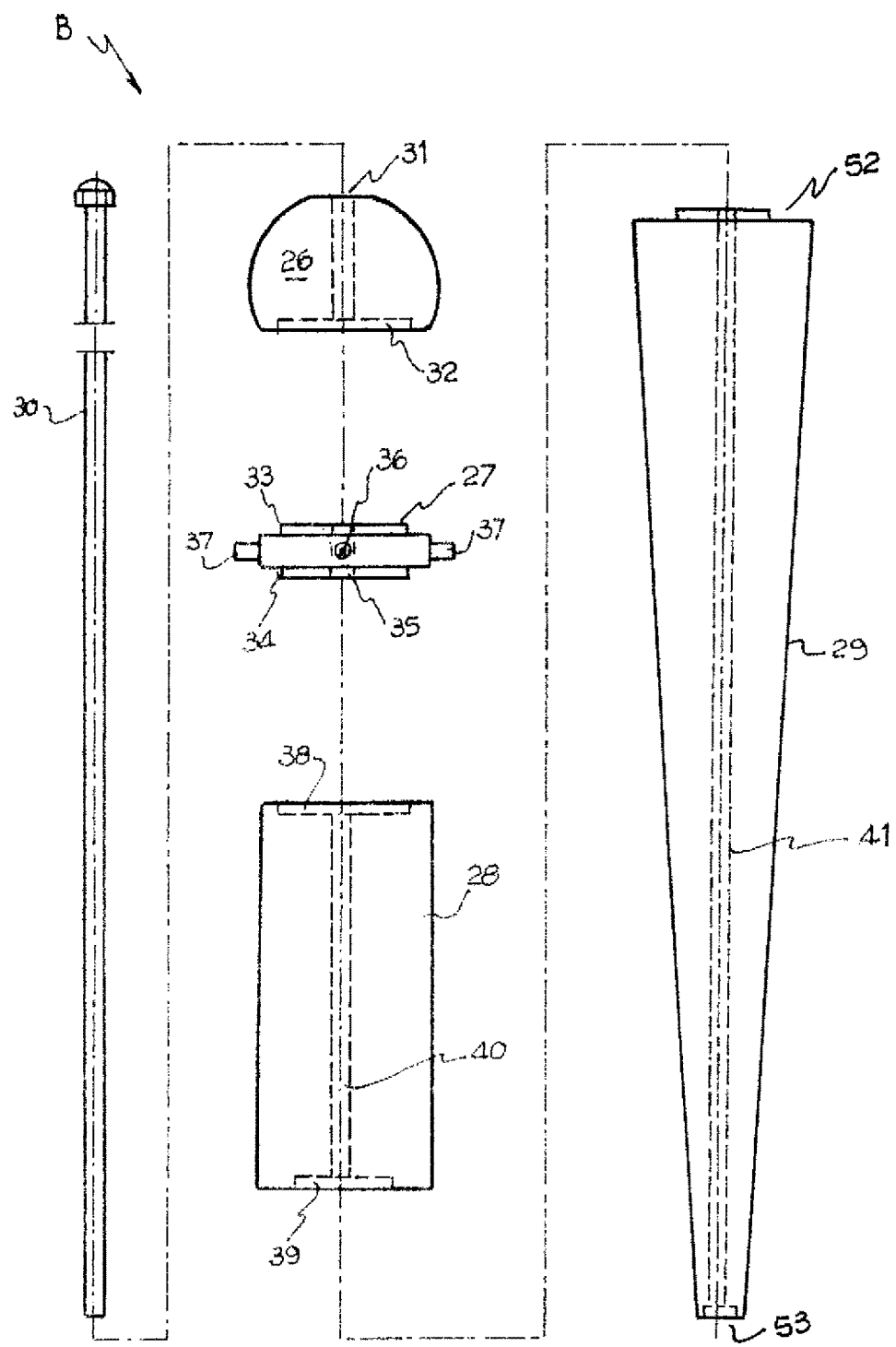
FIG. 5 illustrates an exploded view of the bullet inserted into the upper and lower outer bodies of FIGS. 3 and 4, once assembled.

Finally, and as illustrated in FIG. 5, a bullet B made of AISI 304 stainless steel comprises the following elements: a head 26, an upper centering ring 27, a central body 28, a reduction cone 29, and a coupling rod 30. The head 26 is made of a stainless steel solid bar, which has a dome shaped form. In its center, it has a through hole 31 which crosses it lengthways, so that said coupling rod 30 can pass therethrough. At its bottom part it has an overhand rebate 32 which allows to abut into said upper centering ring 27. Said upper centering ring 27 is built from a stainless steel solid bar, wherein there are machined a ring upper recessing 33, a ring lower recessing 34 and a second through hole 35 which crosses it lengthways, so that said coupling rod 30 can also pass therethrough. In its periphery at least four holes 36 are drilled, distributed at 90°, where at least four stainless steel nipples 37 are nailed (see FIG. 6). These at least four nipples 37 allow fixation of said bullet B to said pipeline, adjacent to the linking of said upper outer body (CES) with said lower outer body (CEI). Said central body 28 of cylindrical shape, is made of a stainless steel solid round bar, which is subjected to central body recessing 38, 39 in the upper and lower portion respectively, in order to allow the abutment with said upper centering ring 27 and with said reduction cone 29. It also includes a third through hole 40 which crosses it lengthways for said coupling rod 30 to pass therethrough. Said reduction cone 29 is made of a stainless steel solid round bar, which is lathed to form the cone, a cone upper rebate 52 in order to link with said central body 28, a cone lower rebate 53 to link with the centering pillow (BC) of said fixing star 23 of said lower outer body (CEI). Also, like to the rest of the pieces, a fourth through hole 41 is drilled on said reduction cone 29 that crosses it lengthways so that said coupling rod 30 can passing therethrough. Said head 26, said upper centering ring 27 and said central body 28 internal diameters are substantially equal. Said head 26, said upper centering ring 27 and said central body 28 external diameters must be defined in order to reduce said pipeline section to generate the Venturi effect, allowing the passing of beverage stream lines. Said internal diameter of the reduction cone 29 varies from an internal diameter substantially equal to said central body 28 internal diameter until it reaches a supplementary internal diameter to that of said centering pillow (BC). The coupling rod 30 has a supplementary thread to that of said threaded opening (OR) so as to fix, such as in the case of nipples 37, the bullet B to the pipeline.

Figure 6:
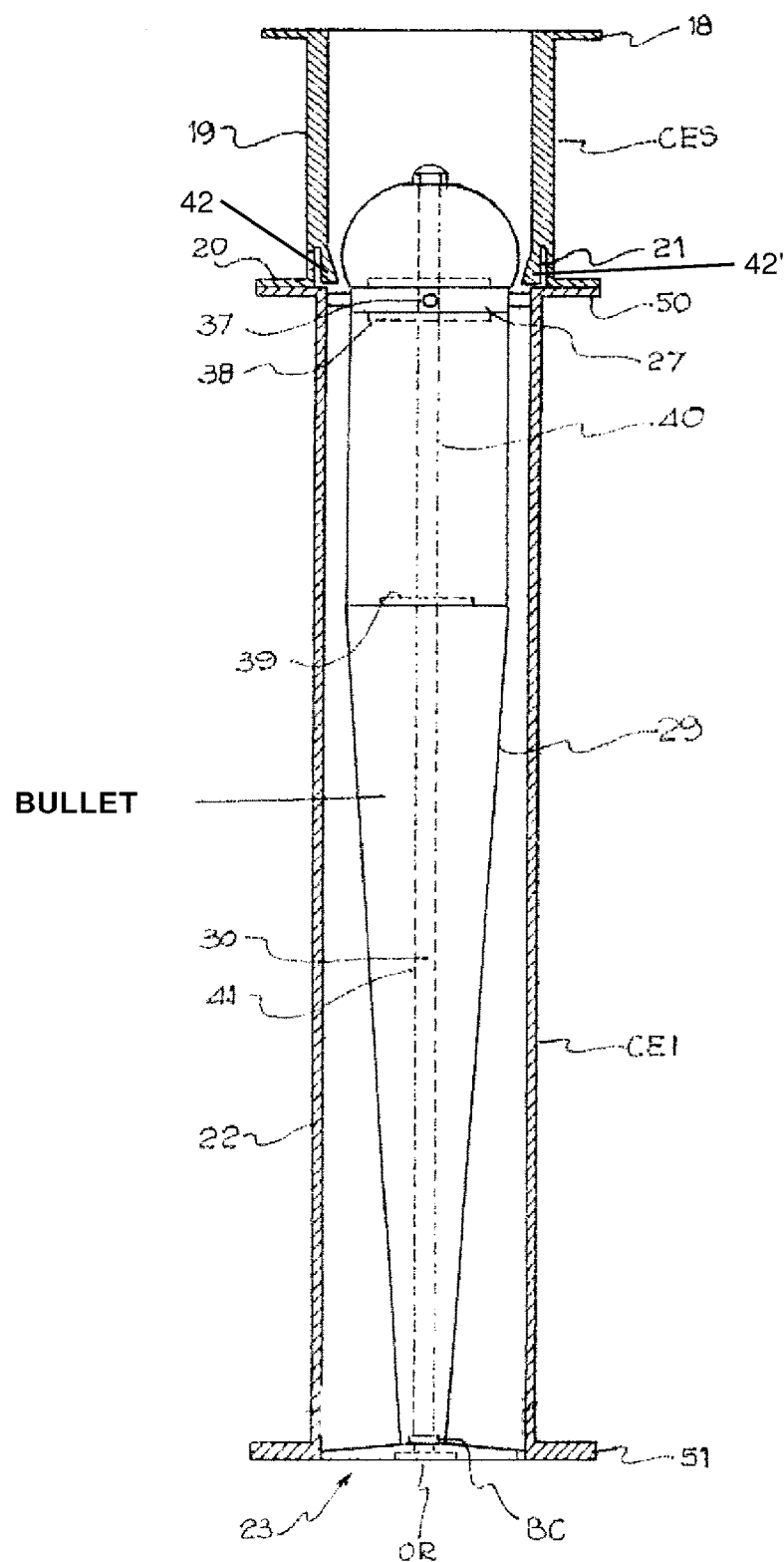
FIG. 6 illustrates final assembly of the present invention device Venturi.

In FIG. 6, the completely assembled set forming the invention Venturi can be observed, where the vortex throttle assembly 41 arranged at the lower end of said bullet B, and formed by at least two vortex elements 42,42' arranged facing each other and on both sides of said lower outer body walls (CEI) can also be observed. The profile and precise location of said at least two vortex elements 42, 42' depend on the desired beverage flow turbulence.

HOW THE DEVICE OF THE INVENTION WORKS

In order to ensure a stable carbonation in a beverage continuous manufacture process three variables should be controlled.

Fluid temperature.
Fluid flow rate.
Venturi inlet gas flow rate.
Venturi reduction (section difference).

The fluid temperature can be controlled by means of a heat exchange system (plate or tube heat exchanger) whether ammonia/water or ammonia/glycol/water. In FIG. 1, a plate heat exchanger upon beverage entry into the carbonation tank 1 is illustrated. The temperature control has no relevance in particular for the design of the invention the, as any temperature control system, according to the flow rate being carbonated, can be used. The ideal beverage temperature to enhance device performance is 4° C. at Venturi inlet. If the beverage temperature increases during the carbonation process, the device will increase the carbon dioxide modulating valve 12 opening. The opening percentage in terms of temperature increase and other details will be explained below. The beverage flow rate at the tank 1 inlet should be constant because the Venturi section V is calculated based on the beverage flow rate that is being packaged, and thus the Venturi section V is fixed. In case of minor beverage flow rate variations at the Venturi inlet V, vacuum thereof will be reduced or increased. This vacuum variation will allow a small offset, as higher or lower carbon dioxide flow rate will enter the Venturi V. Now, if the flow rate is substantially decreased, beverage at the Venturi V would not achieve a turbulent pattern, and thus, no vacuum would exist at the carbon dioxide inlet 10, and this would result in a practically non-carbonated beverage. The gas flow rate at the Venturi inlet V is controlled by modulation of the modulating valve 12, and its logic is detailed below. In summary, we can say that with the modulating valve 12 opening of the Venturi inlet V, we control the volume of carbon dioxide during the process and we offset the temperature or pressure variations on tank 1.

The equipment has a programmable logic controller (PLC), which is in the main board, where different operation options thereof can be accessed. Said programmable logic controller (PLC) is attached to a control point (PC) arranged between said modulating valve 12 and said Venturi inlet V. In the main menu, we could see a working screen list, and among them:

Cooling
Manufacturing
Sanitization
Manual
Settings
Alarms
Calibration screen

We should scroll up and down these options using the arrows in order to access each of them and place the cursor in the desired option/menu. Once positioned, it will be enough to press the largest key on the keyboard, i.e. ENTER.

Carbonated Beverage Production Startup

The startup operation has three stages: first cooling, second production startup per se, and third and last pouring.

First Stage: COOLING a) This step has the purpose of cooling the line (Carbonation tank 1 and Filling Equipment) and removing the air trapped inside the carbonation tank 1. The following procedure should be followed in order to carry out with this step:

b) The cooling equipment should be operative and at working temperature;
c) The beverage manufacturing equipment should be ready for feeding the beverage to the carbonation tank 1; and
d) Access the Manufacturing menu and load the flavor to be packaged.

Under the conditions above, access the Cooling menu and start this operation.

Description of Cooling Process within Carbonation Tank:

Once the cooling process has been started, the discharging valve 5 is closed, and beverage inlet valves to the tank 3 and the venting valve 9 are opened.

It is expected that when the tank level 1 reaches 100%, a pressure of 2 kg/cm$^2$ is reached, thus ensuring the complete filling of tank 1. At this time a signal to stop the beverage feeding is emitted, followed by the closing of beverage inlet valve 3 into the tank 1, the venting valve 9, and finally, the carbon dioxide inlet valve 10 are opened, thus beginning then the tank pressurization 1 with carbon dioxide at 2 Kg/cm$^2$.

Once the tank 1 has been pressurized, the discharging valve 5 is enabled, thus beginning the tank 1 pouring. When the level is zero (that is, when the vibrating fork flags vacuum) 50 seconds venting carbon dioxide through the filling equipment should be waited, and the discharging valve 5 is closed, remaining the device in stop status.

Gas scavenging aims at removing the beverage remaining from the pipelines, as a result from cooling.

Second Stage. Beginning of Carbonation:

Access the Manufacturing menu and once accessed, start production.

Upon beginning of production process, the carbon dioxide inlet valve 10 is opened, allowing its feeding into the tank 1.

The equipment has two setting pressures, a first one for levels 0 to 30%, and a second for levels 30 to 90%.

When the tank pressure 1 reaches the first setting pressure (charge pressure up to 30% level), the beverage manufacturing equipment will receive a signal for beverage feeding into the tank 1.

The tank 1 pressure is measured by means of a pressure transducer, located at the tank 1 head. This pressure could be displayed on the board programmable logic controller (PLC).

When the beverage manufacturing equipment starts delivering the beverage, the carbonating device opens the beverage inlet valve 3 into the tank 1, then the carbon dioxide inlet valve 11 into the Venturi V, and finally the modulating valve 12 is set to a 80% opening, to allow flow rate control in the Venturi V.

While beverage is passing through the heat exchanger H, said beverage reduces its temperature, having to reach the working temperature, some 4° C.

As the beverage is fed to tank 1 the carbon dioxide will solubilize through Venturi V. The beverage being fed to the tank 1 will increase the pressure therein. The modulating valve 12 will begin to close so as to prevent this pressure increasing from affecting the carbon dioxide flow rate in the Venturi V. The modulating valve 12 closing percentage complies with a formula developed according to carbon dioxide variations to different pressures and different closing percentages, for the purpose of maintaining a constant flow rate.

As mentioned above, the concept of pressure control in tank 1 is different from that of conventional systems, as in this case pressure may freely vary. This is possible because the system sets a minimum pressure, and then maintains the flow rate, compensating the pressure increase, reducing the pipe section of an inlet pipe into the Venturi V, thanks to the modulation of the modulating valve 12.

When the load reaches 30%, the device switches automatically to the second setting pressure. This second pressure will be the device process pressure, which can be modified from the board programmable logic controller (PLC).

When the device begins to solubilize the carbon dioxide, the pressure in tank 1 might drop. In order to offset this drop, the carbon dioxide inlet valve 10 opens again, thus compensating minimum pressure in tank 1, hence also the flow rate in Venturi V. This is important because if pressure increases, the modulating valve 12 offsets this variation. On the contrary, if pressure decreases, tank 1 pressure should be increased to prevent flow rate from dropping in the Venturi V.

If while the beverage is loaded into the carbonating device the beverage temperature increases, the carbon dioxide solubility decreases. This principle is based on Henry's law which establishes that a gas solubility in a beverage increases as its temperature decreases.

In order to offset the beverage increased temperature without affecting the carbon dioxide volume, the modulating valve 12 may be opened up to 100%, as its normal working position is 80%, as previously explained.

This means that under optimal working conditions (working flow rate, temperature of 4° C., and setting pressure) the modulating valve 12 will be opened at 80%. If pressure varies exceeding the setting pressure, the modulating valve 12 is closed, whereas if temperature increases exceeding 4° C., the modulating valve 12 increases its opening between 80 and 100%.

Once charging has been completed (maximum predetermined level) a signal is emitted to the beverage manufacturing equipment to stop the feeding thereof.

As soon as the beverage feeding is stopped, the beverage inlet valve 3 into the tank 1 is closed and immediately thereafter, also the carbon dioxide inlet valve 11 into the Venturi V is closed too.

Once the load has been completed, it will be possible to analyze the beverage so as to make sure it is in full compliance with the desired parameters.

While customizing the loading levels in the carbonating device will be possible, in order to provide an homogeneous beverage load, working levels (beverage request and cut) should be above 50% of tank 1, as the beverage inlet pipe is at a 30% level. Also, it should be considered that loads should be greater than 20%. This means that if the request is set at the 50% level, the cut should be higher than 70% and lower than 90%.

In case an alarm is set during the loading process, the device shall display a sign identifying the reason thereof. Alarms may be indicative of:

a) Carbon dioxide low pressure
b) Compressed air low pressure
c) Some of the valves did not open or close
d) The beverage manufacturing equipment is under some non-operating condition
e) The filling equipment is not working
f) Carbon dioxide low level
g) Low level of saccharose dissolved in water (Brix) Brix is used to measure sugar concentration in the beverage.

For sugar-sweetened beverages, Brix degrees (° Bx) measure the total quotient of saccharose dissolved in a liquid. A solution of 25° Bx has 25 g of sugar (saccharose) per 100 g of liquid or, in other words, there is 25 g of saccharose and 75 g of water in 100 g of solution. ° Bx are measured with a saccharometer, which measures the specific gravity of a liquid or, more easily, with a refractometer.

h) Access the Alarm menu from the main menu, and reset (to zero) any alarm which might have been displayed.

i) If the alarm concerns a valve, check its status and operation.

j) When carbon dioxide and Brix are within predetermined parameters, an OK confirmation is sent in order to enable the discharging valve 5. For that purpose, Manufacturing menu should be accessed, and the OK key should be pressed.

k) If carbon dioxide volume was out of specification (this is valid for those devices with an online carbon dioxide meter installed) it will be necessary to recycle the beverage. Recycling consists of feeding the beverage from the discharging tank 1, i.e. from the discharging valve 5, through the recycling valve 7 pipe towards the recycling inlet 8 into the tank 1. Once the beverage accesses the tank 1 in a shower fashion, the re-carbonation or de-carbonation thereof is allowed, the latter in case of pressure decrease in tank 1.

In order to have the beverage recycle, the menu should be accessed manually, and from manufacturing menu press "beverage retrieve". Recycling time will depend on the beverage carbon dioxide level and the desired carbon dioxide volume. Upon recycling, the device prompts the user to enter the volume to be increased, and based on this it calculates the recycling time and waits to stabilize the beverage. These times were collected in a practical way, based on these times between recycling time and beverage carbon dioxide volume increase, proportionality is calculated.

During the run, it may become necessary to increase or reduce pressure in carbonation tank 1 according to carbon dioxide volume. In case of a low volume, pressure should be increased, and in case of a high volume, pressure should be reduced; for that it will be necessary to enter from manufacturing screen the new pressure value for tank 1. It is important that changes in tank 1 pressure are progressive (0.10 Kg/cm$^2$), as a dramatic change could generate a carbon dioxide volume steep or drop in the package to be filled.

Third Stage: Carbonation tank Pouring

When the carbonation tank 1 beverage load is completed, tank 1 will continue delivering beverage to the filling equipment until a 30% level is reached. At this point, discharging valve 5 is closed and a low level of beverage is displayed on the operation screen.

The PLC will cut feeding process when reaching 30%, as below this level beverage inlet pipe to it will be uncovered. If the product inlet pipe is exposed to gas contained therein, beverage entering in it will impact on the gas chamber and over-carbonate. For this reason there are two pressures, a first one until 30% of level, and a second from 30% and above. The first setting pressure is almost 1 Kg/cm$^2$ less than the second setting or working pressure.

Recognizing the alarm by pressing the device, and having it drain. At this point, the device will remain in a Draining status (which allows the final consumption of beverage contained in tank 1 to be made). At this point only the discharging valve 5 will be opened. The rest of the valves will be closed, driving the rest of the beverage by using the pressure remaining in tank 1.

Once the whole packaging has been finished, stop the device by pressing Stop. At this point the device is in STOPPED status with all of its valves closed.

Fourth Stage: Carbonation Tank Sanitization a) With the carbonating device in STOPPED status, access the Sanitization menu from the main menu.

b) Once accessed, press F2 to start this operation.

When PLC is started, the equipment will:

a) Open the discharging valve 5 of tank 1.

b) Open the modulating valve 12 at 100%.

c) Open carbon dioxide inlet valve 11 to the Venturi V.

d) Open the recycling valve 7.

e) The venting valve 9 will work intermittently.

f) The booster pump 6 continues working at maximum speed.

Manual Operation of the Equipment:

In addition automatic production processes described above, the device of the invention has a manual operation screen for pumps and valves comprise therein. This menu may be useful in case of failure, or to check functioning of any particular valve or pump.

What is claimed is:

1. Method for solubilizing carbon dioxide in a beverage using a variable pressure device, the method comprising the following steps:

adding carbon dioxide in a carbonation tank by means of a carbon dioxide inlet valve, adding carbon dioxide in a Venturi, the Venturi being in communication with the carbonation tank, adding beverage in the Venturi, the beverage being carbonated in the Venturi, directing the carbonated beverage to the carbonation tank by means of a beverage inlet valve, controlling the carbon dioxide flow rate that is added in the Venturi by means of a modulating valve and controlling the carbon dioxide flow rate that is added in the carbonation tank by means of the carbon dioxide inlet valve, as the carbon dioxide is solubilized in the beverage, measuring the carbonation tank's pressure;

managing the carbon dioxide flow rate that is added in the Venturi and managing the carbon dioxide flow rate that is added in the carbonation tank according to changes in the measured carbonation tank pressure;

concomitant to the step of measuring the carbonation tank's pressure, setting a desired process pressure of the variable pressure device, the process pressure referring to a desired volume of carbon dioxide to be solubilized in the beverage; and managing the carbon dioxide flow rate that is added in the Venturi and managing the carbon dioxide flow rate that is added in the carbonation tank if the value measured for the carbonation tank's pressure is not equal to the value of the process pressure.

2. The method according to claim 1, further comprising the steps of:

managing the carbon dioxide flow rate that is added in the Venturi and managing the carbon dioxide flow rate that is added in the carbonation tank until the value measured for the carbonation tank's pressure is equal to the value of the process pressure.

3. The method according to claim 2, further comprising the step of:

reducing the carbon dioxide flow rate that is added in the Venturi if the value of the process pressure reaches a value lesser than the value measured for the carbonation tank's pressure, or increasing the carbon dioxide flow rate that is added in the carbonation tank if the value of the process pressure reaches a value greater than the value measured for the carbonation tank's pressure.

4. The method according to claim 3, wherein the step of controlling the carbon dioxide flow rate that is added in the Venturi and the step of controlling the carbon dioxide flow rate that is added in the carbonator tank are done by means of the modulating valve percentage of opening and by means of the carbon dioxide inlet valve percentage of opening, the method further comprises the step of:

open the modulating valve at 80% of its percentage of opening if the value of the process pressure is equal to the value measured for the carbonation tank's pressure.

5. The method according to claim 4, wherein it further comprises the step of:

increasing the modulating valve to between 80% and 100% of its percentage of opening if the step of increasing the carbon dioxide flow rate that is added in the carbonation tank is unable to make the value of the process pressure equal to the value of the measured carbonation tank's pressure.

6. The method according to claim 5, wherein the carbonated beverage is added in the carbonator tank in a point located in 30% of the carbonator tank's level.

7. The method according to claim 6, further comprising the steps of:

interrupting the introduction of carbon dioxide and carbonated beverage in the carbonator tank, and interrupting the introduction of carbon dioxide in the Venturi when the level of the carbonator tank reaches a maximum pre-determined level, and then, measuring, by means of a carbon dioxide meter associated to the carbonation tank, a carbon dioxide volume carbonated in the beverage.

8. The method according to claim 7, further comprising the steps of:

recycling the carbonated beverage, by feeding the carbonated beverage from a bottom portion of the carbonation tank to an opposite portion of the carbonation tank, by means of a discharging valve, if the value measured for the carbon dioxide volume carbonated in the beverage is not equal to the desired volume of carbon dioxide referred to the process pressure.

9. The method according to claim 8, wherein the step of recycling the beverage in the carbonation tank is done in a shower fashion.

10. The method according to claim 9, wherein it further comprises the step of feeding the carbonated beverage to a filling equipment associated to the carbonation tank and by means of the discharging valve, if the value measured by the carbon dioxide meter is equal to the desired volume of carbon dioxide referred to the process pressure, and, interrupting the feeding of the carbonated beverage to the filling equipment when the level of the carbonation tank reaches the level wherein the carbonated beverage is added in the carbonation tank.

* * * * *